Figure 1:
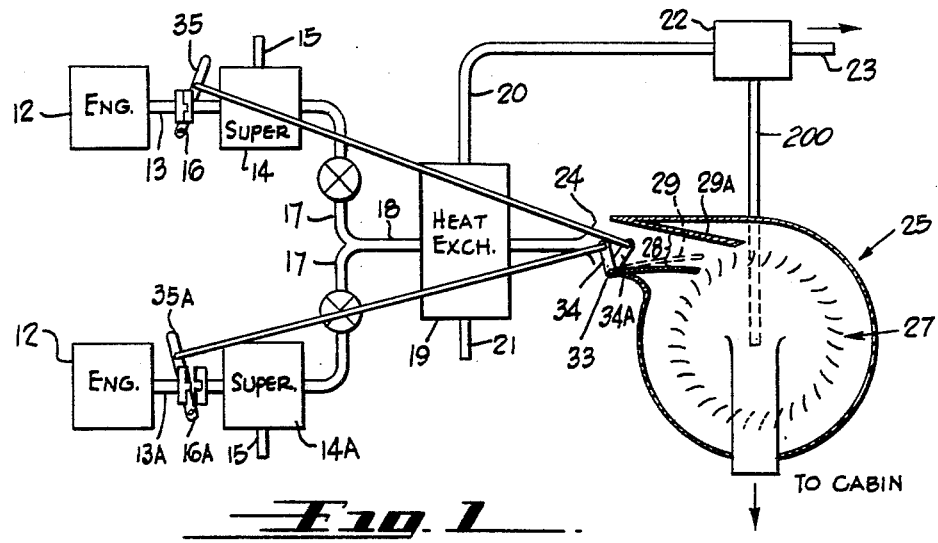

INVENTOR.
WILBUR W. REASER
BY
*Edwin Coates*
ATTORNEY.

United States Patent Office 2,940,280
Patented June 14, 1960

2,940,280

VARIABLE COOLING TURBINE

Wilbur W. Reaser, Pacific Palisades, Calif., assignor to Douglas Aircraft Company, Inc., Santa Monica, Calif.

Filed Dec. 31, 1958, Ser. No. 784,328

13 Claims. (Cl. 62—402)

This invention relates to airplane air conditioning systems and particularly to these systems as applied to large, dual-duty airplanes, including tanker-and-transport airplanes.

Airplanes of this type may be employed either to transport in their fuselages a cargo of fuel together with means for dispensing this fuel to short-range aircraft suitably temporarily in communication therewith for transfer of fuel; or they may be readily converted into troop transports by removing the refuelling fuel tanks, etc., and installing troop accommodations.

In either case it may be necessary to maintain the interior of the fuselage at certain predetermined relatively cool temperatures, in the first instance, in order to avoid the effects of heat upon the volatile and inflammable fuel and in the second instance for the purpose of preserving the health or comfort of the troops.

However, when operating as a tanker the cooling needs of the fuselage's interior are less than when the craft is doing duty as a troop transport. Cooling turbine systems employing a plurality of sources of compressed air are conventionally employed for these craft and if one of these sources should fail, there are no means available for taking care of this situation and maintaining the aforesaid predetermined temperatures.

This invention provides a novel system and an improved cooling turbine which can take care of these various cooling needs in such a manner as to maintain the optimum temperature in the fuselage at substantially all times, whether the fuselage be that of a tanker airplane or a troop transport and whether all sources of cooling air are contemporaneously available or if only one source is available.

Essentially, the system comprises a multi-engine powered multi-supercharger source of cooling air feeding a single cooling turbine. The turbine is provided with an unique nozzle construction adapted to effect variance of the inlet area to the turbine in proportion to the volume of air directed thereto by the cabin-air superchargers. The drive shafts connecting the engines and the superchargers are provided with clutches intermediate them and the respective engines, and suitable linkage interconnects each clutch-handle with a respective one of a pair of levers. These levers are clutched to the mounting shaft of a Venturi vane type variable area valving means in the inlet to the cooling turbine, the clutches on the mounting shaft being conventional one-way clutches. These clutches torque this shaft together to cause the Venturi vane to restrict the inlet area and increase the velocity of the diminished amount of compressed air entering the inlet. When the craft is to serve as a tanker, the pilot can declutch and disengage one supercharger, or both, if the tanker is operating at ultra-high altitudes. This operation actuates the vane in the throat of the cooling turbine in such a manner as to constrict the throat in Venturi-fashion, accelerates the flow therethrough of the supercharged air from the single supercharger, if used, and with this smaller volume of accelerated air, provides fuselage-cooling at nearly the same rate per pound of air as with both superchargers working but with the throat "wide open." The same condition obtains if one of the superchargers or one of the engines should fail, instead of intentionally being cut out.

When the craft is to serve as a troop-transport of course both superchargers are operated and the inlet to the cooling turbine remains in its fully opened condition, furnishing to the cooling turbine a larger quantity of supercharged air flowing thereinto at a relatively slower rate. The cooling turbine is preferably coupled drivingly to a "braking" compressor to prevent the turbine from "running away," that is, to absorb the excess power of the turbine. An intercooler is also preferably interposed between the turbine and the superchargers for preliminarily cooling the supercharged air before it reaches the turbine and the ambient air used in the intercooler is "evacuated" therefrom by virtue of its connection to the intake "side" of the aforesaid compressor.

One of the embodiments of these and other concepts, selected from several at present contemplated, is illustrated in the accompanying drawing and is described in detail hereinafter in conjunction with these showings.

Figure 2:
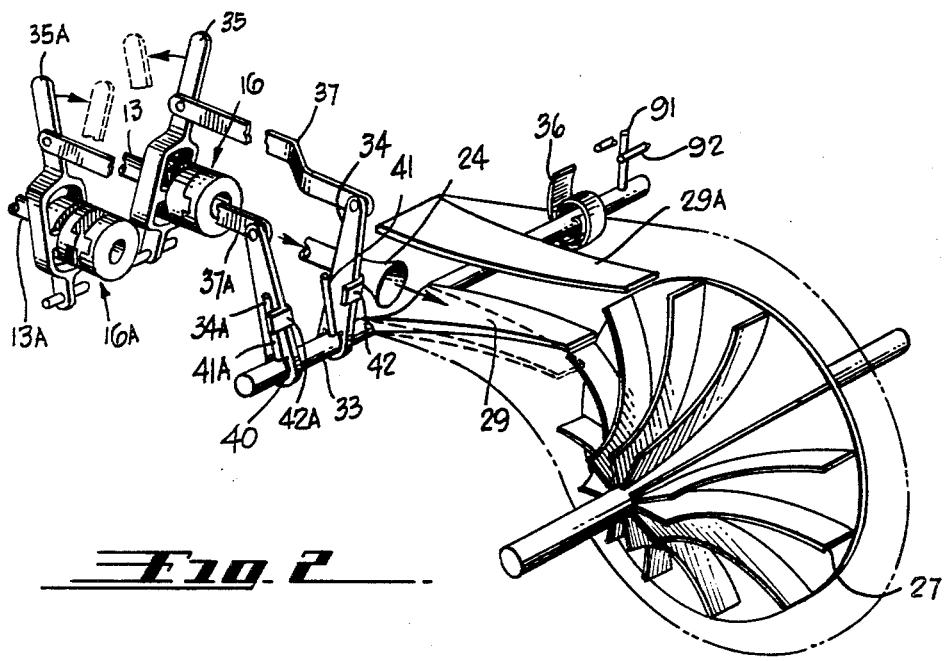

In these drawings:

Fig. 1 is a diagrammatic layout of the present system as combined with two of the propulsion engines of a dual-function, or convertible aircraft; and Fig. 2 is a perspective view of the cooling turbine showing the supercharger-and-nozzle operating linkage or selective control system.

The system of the invention is depicted, by way of example, as powered by a plurality of reciprocating, piston-type engines, but the invention also contemplates the possibility that the system may be utilized in conjunction with turbo-compressor jet engines.

The specific configuration shown includes a pair of piston-type engines 12 each having a power-takeoff shaft, or other rotary shaft, 13 and 13A by means of which each engine drives cabin-air pressurizing compressor means, 14, 14A, such as conventional air-conditioning superchargers. Each supercharger is provided with an ambient air inlet 15, preferably for ram air, and each supercharger communicates with a bifurcated compressed air conducting conduit 17, the two forks of 17 joining in a duct 18 leading to a heat exchanger 19 which is of the intercooler type. Intercooler 19 has a ram air inlet 21 and a conduit 20 leads therefrom to a "drag," or braking, compressor 22 that includes an overboard discharge 23.

A short conduit 24 leads the somewhat pre-cooled but compressed air into the throat of a turbine 25, which is here shown as an expansion-type cooling turbine that employs the compressor 22, by way of drive shaft 200, as a "loading" means for dissipating the power of turbine 25, so that, among other things, the turbine will not "race" or "run away." It follows as a natural corollary, therefore, that since turbine 25 could well be operated with various types of rotors, etc., other than the expansion type 27 shown, turbine 25 could well be a "power" turbine rather than a cooling turbine and, in either case, rather than driving a mere drag or brake compressor, turbine 25 could be made to do useful work, such as driving the compressor of a conventional "Freon" aircraft refrigerating system.

In any case, the invention contemplates that the turbine, whether a cooling turbine or a power turbine, shall include, in the aforementioned throat, means for varying the inlet-area thereof. Among other instrumentalities contemplated for this purpose is the variable area inlet nozzle group 28 of the configuration shown in Figs. 1 and 2. This nozzle portion or throat of the turbine includes a movable, so-called Venturi, vane 29 contoured longitudinally and cross-sectionally or of compound curvature, in the manner shown so as to be able to cooperate, in its active position, with the complementarily contoured upper wall 29A of the throat to then define a sort of Venturi like tube. Such tube is adapted to accelerate the flow therethrough of compressed air from the intercooler to such an extent as to compensate, in the cooling turbine, for any diminution in volume of air fed the turbine when one supercharger is cut out or fails.

Venturi vane 29 is fixed integrally to a torquable support shaft 33 which is so biased by a spring 36 as to force the vane 29 normally to lie in retracted position, as shown in dotted lines in Fig. 2. In retracted position, the vane 29 does not form a Venturi throat with the upper Venturi-warped surface of the inlet throat and in fact has no appreciable effect upon the full flow of compressed air therethrough, for then the combined output of both superchargers is entering the cooling turbine.

The vane 29 is raisable to form the throat into an orifice somewhat resembling a Venturi tube in conjunction with a similarly warped-surface face 29A in the throat, when one of the superchargers becomes inoperative. Temporarily, therefore, the pre-cooled compressed air discharged into the throat through the conduit 24 is, before it strikes the rotor of the turbine, increased in velocity sufficiently to compensate for loss in air-volume and substanially meet the cooling needs of a transport aircraft if one supercharger fails, and to completely meet the cooling requirements of a tanker aircraft. It is essential, however, that the one of the two compressed air supplying groups, either 14 or 14A, or both, be capable of being temporarily inoperable upon the system and be again connectible into the system without affecting the operation or mechanism of the other compressed air supplying group.

Among the throat control means and vane operating means contemplated for achieving these, and other, results, Figs. 1 and 2 show the now preferred form in which each power take-off shaft 13 and 13A is provided with hand-lever operated type clutch, 16 and 16A, conventionally used for clutching such engines to such superchargers, the clutch 16A being clutchable by positioning handle 35A to the rightward, and the clutch 16 also being clutchable by positioning handle 35 to the rightward.

In order to enable the declutching action of either clutch, 16 and 16A, to raise vane 29 without affecting the clutch, etc., of the other air supplying group, shaft 33 is provided with a pair of generally upright, longitudinally spaced horns, 34 and 34A, freely rotatably mounted thereon and held against axial displacement by snap rings 40. Horn 34 is connected to lever 35 by link 37, and horn 34A is connected to lever 35 by link 37, and horn 34A is connected to lever 35A by link 37A.

A pair of upright pins 41 and 41A protrude from the upper periphery of shaft 33, each pin being contactible by one of the ears 42 and 42A on the inner face of each horn or arm when links 37 and 37A are pulled in declutching. The horns are capable of a limited amount of rotational movement around shaft 33, although restrained against longitudinal movement therealong as aforesaid. On the distal end of shaft 33 there is a detent 91 and stop 92 effective to limit the degree of rotation of 33.

Thus, shaft 33 can be torqued to raise vane 29 to close the throat approximately half way when power clutch lever 35 is moved into it dotted line position to "declutch" and run the system on only the lower air-supply group and to cut out the upper compressed air supply unit. When lever 35A is declutched to run the system on but the upper power unit, horn 34A similarly, brings its ear 42A to bear against pin 41A and torques shaft 33 to again raise 29 to the halfway position.

It will be apparent to those skilled in the art that various changes and modifications may be made in the construction set forth without departing from the spirit of the invention, and it is intended that all such changes and modifications shall be embraced within the scope of the subjoined claims.

I claim:

1. An air-conditioning system for an aircraft's enclosure, comprising: a plurality of powered means for affording pressurized air, each of said powered means including disconnectible means connecting same to its power-source; a pressurized-air operated work-doing means, said means having a pressurized-air inlet throat including means movable therein to increase the velocity of air inlet into said work-doing means, and said work-doing means including an air-discharge leading into said enclosures; conduit means connecting said air-affording means to said inlet throat; and control means connecting the velocity-increasing means in said inlet to each of said disconnectible means, said control means being selectively operable on each of said disconnectible means and on said velocity-increasing means to effect air-velocity increasing operation of said velocity-increasing means and concurrently to disconnect any one of said powered means from its power-source without disconnecting the remaining powered means; whereby to maintain the useful work accomplished by said work-doing means at the optimum.

2. An air-conditioning system for an aircraft's enclosure, comprising: a plurality of power sources; a plurality of supercharges each driven by a power source to supply pressurized air for the enclosure and each supercharger and power source being occasionally inoperable; drive-disconnecting means in the drive between each power source and its driven supercharger; work-doing means having an inlet throat for said pressurized air, said inlet throat including means movable therein for increasing the velocity of air flowing into said work-doing means thru said air-inlet means; said work-doing means including an outlet leading to said enclosure; and control means for said velocity-increasing means connected to each of said drive-disconnecting means and to said velocity-increasing means and selectively operable on each of said disconnectible means and on said velocity-increasing means for effecting air velocity-increasing operation of the latter in correspondence to a diminution in the number of superchargers in operation.

3. In an air-conditioning system that includes a plurality of superchargers each disconnectibly connected to a power-source and a work-doing means having an inlet flow-connected to said superchargers and an outlet for air cooled therein, said inlet including velocity-increasing means movable therein for maintaining substantially constant the work-doing capability of said work-doing means despite a drop in the volume of air admitted thereto from the supercharger group; control means comprising means connected to said velocity-increasing means and to each of the disconnectible connections of said superchargers, said control means being operable for effecting movement of the velocity-increasing means in that direction which increases the velocity of the air let into the work-doing means in correspondence to a diminution in the number of superchargers in operation so as to maintain the cooled air discharged through said outlet at an optimum value.

4. In a cabin air-conditioning system that includes a pair of superchargers each disconnectibly driven by a power source and a work-doing compressed air driven instrumentality having an inlet throat flow-connected to said superchargers and an outlet discharging into the cabin; movable means in said inlet throat for decreasing the cross-sectional area thereof in such manner as to increase the velocity of air emitted by said throat; and selective control means connected to the disconnectible drive of each of said superchargers and to said movable means and selectively operable to effect air velocity-increasing movement of said movable means and concurrent disconnection of one of said superchargers from its power source.

5. An air-conditioning system for an enclosure in an aircraft, comprising: a plurality of superchargers; a power-source disconnectibly driving each supercharger; a cooling turbine having an inlet throat and a member movable in said throat to vary the effective inlet area thereof and a cooled air discharge into said enclosure; conduit means connecting said sources to said inlet throat; and selective control means area-controllingly connected to said member and selectively connected to the disconnectible drive of each supercharger, said control means being selectively operable for disconnecting all but one of said sources from said conduit means while concurrently moving said member in that direction which decreases the cross-sectional area of said inlet so as to increase the velocity of air-flow therethrough, to enable the single source of pressurized air to afford adequate cooling in said enclosure.

6. An air conditioning system for an enclosure in an aircraft, comprising: a plurality of sources of pressurized ambient air; a cooling turbine including an inlet throat having movable Venturi-nozzle means therein for varying the area thereof so as to establish substantially a Venturi effect therein, said turbine having a cooled-air discharge leading into said enclosure; conduit means connecting said sources to said inlet throat; and selective control means and area-controllingly organized and connected to said area-varying means and operable to decrease the cross-sectional area of said inlet while disconnecting all but one of said sources, and enable said turbine to adequately cool said enclosure with but one of said sources flowingly connected to said conduit-means.

7. An air conditioning system for an enclosure in an aircraft, comprising: a plurality of power-sources; air-compressing means drivenly connected to each of said sources, each compressing means having an outlet; drive-disconnecting means in the drive between each source and each compressing means operable to interrupt the drive; air-expansion-driven, work-doing means having an inlet throat including variable area nozzle means therein, said work-doing means also including discharge means leading into said enclosure; conduit means connecting the outlet of each compressing means to the inlet of throat of said work-doing means; and selective control means controllingly organized with each of the aforementioned drive-interrupting means and with said area-controlling nozzle means, said selective means being operable to so decrease the area of said inlet as to increase the airflow velocity therethrough and enable said work-doing means to adequately cool said enclosure with but one of said air-compressing means operating in conjunction with said work-doing means.

8. An air conditioning system for an enclosure in an aircraft, comprising: a plurality of power-sources; an air-compressing means drivenly connected to each of said power-sources, each compressing means having an outlet; clutch-means in the driving connection between each power-source and the compressing means driven thereby, said clutch-means including an operating handle therefor; air expansion-driven work-doing means having an inlet throat including throat area varying nozzle means therein, said work-doing means including discharge means leading into said enclosure; conduit means connecting each of said compressing means outlets to the inlet of the work-doing means; and linkage means connecting each of said handles and said variable area nozzle means and organized with said clutch means and said nozzle means to decrease the cross-sectional area of said inlet to enable selective operation from among said air compressing means while decreasing the area of the inlet to said work-doing means and increasing the velocity of airflow therethrough so as to compensate for any diminution in the volume of compressed air fed to said inlet due to failure of all but one of the sources of air for said work-doing means.

9. An air conditioning system according to claim 5 and in which said variable area inlet nozzle means comprises a Venturi-cambered vane disposed in said inlet with the convexly cambered surface facing inwardly of the inlet and adapted to cooperate with a similarly cambered super-adjacent surface in said inlet; a shaft carrying said vane and extending transversely of the inlet; spring-means associated with said shaft so as to bias said vane normally retracted against the sub-adjacent side of the inlet; and respective clutch-means on said shaft respectively connected to said selective control means and operable respectively to torque said shaft and move said vane into a substantially Venturi-tube establishing relationship with the opposed surface of said inlet.

10. An air-conditioning system according to claim 5 and in which the disconnectible means each includes a mechanical clutch disconnectibly and connectibly interposed in the drive-transmission means, each clutch including an operating lever therefor, the levers being movable in the same direction in de-clutching to disconnect the drive; a shaft supporting said member in said inlet, the shaft being normally spring biased in that direction which biases the member into an ineffective position; a pair of horns disposed longitudinally apart on said shaft; a pin fixed upright to said shaft adjacent each horn; each horn having a detent thereon for engaging the pin to torque the shaft so as to raise the member into effective position.

11. In combination: a plurality of sources of pressurized air; air-pressure-energy dissipating means having an inlet throat and area varying inlet nozzle means in said throat; conduit means connecting said sources to said inlet; and means for selectively flow-controlling each of said sources and concomitantly controlling the cross-sectional area of said nozzle means; said selective-flow controlling means including a throat area varying means; pivotal means for carrying said area varying means; and a pair of selectively operable instrumentalities mutually so arranged on said pivotal means with reference to each other and so connected to the area—varying means in said nozzle means, that operation of but one of said pair of instrumentalities affects the area of the throat less than does the operation of both said instrumentalities.

12. An air-conditioning system for an enclosure in an aircraft, comprising: a plurality of disconnectibly-powered air compressing means for affording pressurized air; a pressurized-air-operated work-doing means having a pressurized-air inlet including means therein movable to increase the velocity of air admitted thereinto; conduit means connecting said air-affording means to said inlet; and control means selectively connecting the velocity-increasing means to each of the drive-connections for the disconnectibly powered means, said control means being selectively operable to cause said velocity increasing means to move in a manner to maintain the useful work accomplished by said work-doing means at substantially the optimum regardless of the state of the inoperability of any one of said powered means for affording pressurized air.

13. A cabin air conditioning system, comprising: powered sources of pressurized air each including means for de-powering it, thereby diminishing the total air afforded by said sources; a work-doing instrumentality having an inlet; conduit means connecting said inlet and said sources; means in said inlet movable with reference thereto to augment air velocity therethrough substantially commensurately with the diminution of air-volume supplied thereto; means interconnecting said movable-means with each of said de-powering means and selectively operable to concurrently disconnect from the system selective ones of said sources and to concurrently move the movable means into said velocity-increasing position; and a discharge conduit leading from the work-doing instrumentality into the cabin.

References Cited in the file of this patent
UNITED STATES PATENTS

| | | |
|---|---|---|
| 2,625,008 | Crook | Jan. 13, 1953 |
| 2,800,002 | Seed | July 23, 1957 |
| 2,856,758 | Eggleston | Oct. 21, 1958 |